United States Patent Office 3,503,699
Patented Mar. 31, 1970

3,503,699
**STABLE HIGHLY CONCENTRATED
SOLUTIONS OF BASIC DYES**
Gerhard Wellenreuther and Hans Burkhardt, Limburgerhof, Pfalz, and Heinz Eilingsfeld, Ludwigshafen (Rhine), Germany, assignors to Badische Anilin- & Soda-Fabrik Aktiengesellschaft, Ludwigshafen (Rhine), Germany
No Drawing. Filed Feb. 21, 1967, Ser. No. 617,466
Claims priority, application Germany, Mar. 2, 1966,
1,619,327
Int. Cl. C09b 67/00
U.S. Cl. 8—93
7 Claims

ABSTRACT OF THE DISCLOSURE

Highly concentrated stable solutions of basic dyes in cyanohydrins or chlorohydrins.

---

This invention relates to stable, highly concentrated solutions of basic dyes in cyanohydrins or chlorohydrins.

Basic dyes of the di- and triarylmethane series as well as basic azo, azomethine, methine and azapolymethine dyes are used in large amounts by the textile and paper industries. The dyes are usually marketed in the form of fine powders which however have been found to have very serious defects. For example, the dust they develop is a considerable nuisance; when improperly stored, they cake together to form lumps which are very difficult to dissolve; and they foam considerably on dissolution or stirring. Although a number of improvements aimed at overcoming these defects have been recommended, the problems have not been satisfactorily resolved. Some dye manufacturers have therefore taken to marketing the dyes in a more suitable form. Highly concentrated, stable dye solutions have for example been sought for printing purposes from which print pastes can be prepared in a simple manner. The solvents used must be compatible with the chemicals normally used in printing operations. Moreover, they must not attack the rubber printing blocks used for example in flexography.

The production of highly concentrated stable dye solutions however presents considerable difficult, as on the one hand the solubility in the usual solvents of the basic dyes present as salts is too low and on the other hand the dyes tend to crystallize out of the highly concentrated solutions. To remedy this defect, it has been proposed to use, instead of the salts with the usual anions, such as chloride, nitrate, etc., anions, salts of the basic dyes with carboxylic acids which have superior solubility.

We have now found that outstandingly stable, highly concentrated solutions of basic dyes may be obtained without special anions by using for their preparation salts of basic dyes, especially diarylmethane, triarylmethane, pyronine, rhodamine, acridine, safranine, oxazine, quinoline and thiazole dyes, and also salts of basic azo, azomethine and polymethine or azapolymethine dyes and, as solvents, low molecular weight aliphatic cyanohydrins, chlorohydrins, chlorocyanohydrins or mixtures thereof with other solvents.

Examples of specific solvents are ethylene cyanohydrin, ethylene chlorohydrin, propylene cyanohydrin and chlorocyanohydrin. These may be used either by themselves or in admixture with other solvents. Other solvents which may be used in combination with the solvents to be employed according to this invention are for example alcohols, glycols, glycol ethers and water-soluble polyethers. Liquid acid amides and their derivatives, e.g. formamide and demethylformamide, as well as carboxylic acids, e.g. formic acid and acetic acid, may also be used. The concentration in the solvent mixture of the solvents to be used according to this invention is preferably higher than 50%. Suitable alcohols, glycols and glycol ethers are in particular ethanol, n- and iso-propanol, ethylene glycol, diethylene glycol, propylene glycol, ethylene glycol monomethyl or ethyl ether and triethylene glycol.

The term "basic dyes" as used herein refers to dye salts whose chromophore is a cation. Di- and triarylmethane dyes are particularly suited to the preparation of solutions according to this invention.

The anions of the dye salts may be derived from inorganic or organic acids. Examples of anions of dye salts are the chloride, nitrate, methyl sulfate, ethyl sulfate and benzene sulfonate anions.

Examples of dyes to be used for preparing solutions according to this invention are auramine benzene sulfonate, auramine nitrate, Victoria Blue B (C.I. 44,045), Victoria Pure Blue B (C.I. 44,045), Crystal Violet (C.I. 42,555), Methyl Violet (C.I. 42,535) and Chrysoidine (C.I. 11,270). Ethyl Violet (C.I. 42,600), Rhodamine B (C.I. 45,170), Rhodamine Ethyl Ester (C.I. 45,160) and the corresponding methyl ester may also be mentioned.

The solutions are prepared in a simple manner, for example by stirring the dyes, preferably as obtained in the manufacture, into the solvents or solvent mixtures. It is possible to start with either pure or shaded dyes. It is also possible to prepare a specific shade by mixing ready-made solutions or by admixing a dye powder with a solution.

The new solutions contain the dyes in very high concentrations of for example 70%, preferably 30 to 60%, with reference to the total weight of the solution, but despite their high dye content they have the nature of true solutions. Although the solutions are supersaturated, they remain liquid even at temperatures far below freezing point and the dissolved dyes do not crystallize out. There is no concentration gradient in the solution even after prolonged standing.

The solutions of this invention are miscible with the organic solvents employed in the manufacture of printing inks, e.g. alcohols, glycols and liquid carboxylic amides, in all proportions. A small amount of water has no adverse effect. When using dyes which have relatively good solubility in water, the solutions of this invention are miscible in all proportions with water, too.

Aqueous dye solutions which may be used as dye liquors in the textile industry or for the production of metal complex dyes can thus be obtained in a simple manner.

The dye solutions lend themselves admirably to the preparation of print pastes which must combine high dye concentration with low solvent concentration to ensure adequate drying speed of the prints.

The dye solutions of this invention are compatible with the solvents employed in printing operations and do not attack the rubber printing blocks used in flexography.

The invention is further illustrated by the following table which gives a number of examples of dye solutions according to this invention.

| | Dye | Amount, parts by weight | Solvent | Amount, parts by weight | Concentration of dye in solution, percent |
|---|---|---|---|---|---|
| Example: | | | | | |
| 1 | Auramine nitrate | 50 | Ethylene cyanohydrin | 50 | 50 |
| 2 | Auramine benzene sulfonate | 45 | ....do.... | 55 | 45 |
| 3 | Rhodamine methyl ester | 40 | ....do.... | 60 | 40 |
| 4 | Rhodamine ethyl ester | 35 | ....do.... | 65 | 35 |
| 5 | Victoria Blue B | 50 | ....do.... | 50 | 50 |
| 6 | Victoria Pure Blue B | 60 | ....do.... | 40 | 60 |
| 7 | Crystal violet | 50 | ....do.... | 50 | 50 |
| 8 | Methyl violet | 60 | ....do.... | 40 | 60 |
| 9 | Auramine benzene sulfonate | 40 | Chlorocyanohydrin | 60 | 40 |
| 10 | Rhodamine ethyl ester | 40 | ....do.... | 60 | 40 |
| 11 | [structure] | 50 | Ethylene cyanohydrin | 100 | 33.3 |
| 12 | [structure] | 65 | ....do.... | 100 | 43.3 |
| 13 | [structure] | 50 | ....do.... | 100 | 33.3 |

We claim:

1. A concentrated solution of a salt of a basic dye in a solvent selected from the group consisting of cyanohydrins, cyanochlorohydrins, mixtures thereof and mixtures thereof with other solvents.

2. A concentrated solution as claimed in claim 1 containing as the solvent a cyanohydrin, or cyanochlorohydrin in a concentration above 50%.

3. A concentrated solution as claimed in claim 1 containing ethylene cyanohydrin as the solvent.

4. A concentrated solution as claimed in claim 1 having a dye content of about 30 to 60%.

5. A concentrated solution as claimed in claim 1 containing a di- or triarylmethane dye as the basic dye.

6. A concentrated solution as claimed in claim 1 containing 30 to 45% auramine nitrate or auramine benzene sulfonate as the basic dye.

7. A concentrated solution as claimed in claim 1 containing as the basic dye a compound of the formula

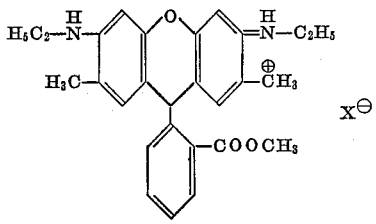

or

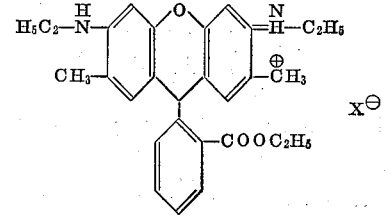

where X denotes an anion selected from the class consisting of chloride, nitrate, methyl sulfate, ethyl sulfate and benzene sulfonate anions.

References Cited

FOREIGN PATENTS 214,246   4/1923   Great Britain.

DONALD LEVY, Primary Examiner

U.S. Cl. X.R.

8—7, 62

PO-1050
(5/69)

UNITED STATES PATENT OFFICE
CERTIFICATE OF CORRECTION

Patent No. 3,503,699                  Dated March 31, 1970

Inventor(s) Gerhard Wellenreuther et al

It is certified that error appears in the above-identified patent and that said Letters Patent are hereby corrected as shown below:

Column 1, line 44, "difficult" should read --difficulty--.

Column 3, in the table, example 13, that portion of the formula reading "$CH_3SO_4^+$" should read -- $CH_3SO_4^{\ominus}$ --.

Column 4, lines 40 and 41, claim 7, in the formula, that portion of the formula reading "$\underset{H}{N}$" should read -- $\underset{N}{H}$ --.

SIGNED AND
SEALED
JUL 21 1970

Attest:

Edward M. Fletcher, Jr.
Attesting Officer

WILLIAM E. SCHUYLER, JR.
Commissioner of Patents